United States Patent [19]

Roy et al.

[11] Patent Number: 4,843,462
[45] Date of Patent: Jun. 27, 1989

[54] REMOTE VIDEO OBSERVATION SYSTEMS

[75] Inventors: Bernard J. J. Roy; Lorne D. O'Connor, both of Laval; Phillipe F. Rioux, Boucherville, all of Canada; Donald A. Dingle, Burlingame, Calif.; Andre L. Raymond, Therese, Canada

[73] Assignee: ADT Security Systems, Inc., Parsippany, N.J.

[21] Appl. No.: 93,241

[22] Filed: Sep. 4, 1987

[51] Int. Cl.$^4$ ............... H04N 7/18; H04N 7/04
[52] U.S. Cl. ..................... 358/108; 358/141
[58] Field of Search ............ 358/141, 108, 133, 135, 358/136, 260, 12, 160, 93

[56] References Cited

U.S. PATENT DOCUMENTS

| | | | |
|---|---|---|---|
| 4,125,862 | 11/1978 | Catano | 358/140 |
| 4,222,076 | 9/1980 | Knowlton | 358/263 |
| 4,261,018 | 4/1981 | Knowlton | 358/263 |
| 4,264,927 | 4/1981 | Raymond et al. | 358/108 |
| 4,348,693 | 9/1982 | Cauldwell | 358/140 |
| 4,400,717 | 8/1983 | Southworth et al. | 358/13 |
| 4,414,580 | 11/1983 | Johnsen et al. | 358/260 |
| 4,646,134 | 2/1987 | Komatsu et al. | 358/11 |
| 4,654,484 | 3/1987 | Reiffel et al. | 358/133 |
| 4,660,096 | 4/1987 | Arlan et al. | 358/310 |
| 4,672,444 | 6/1987 | Bergen et al. | 358/140 |

OTHER PUBLICATIONS

M. Kunt, "Source Coding of X-Ray Pictures," IEEE Trans. on Biomedical Engineering, vol. BME-25, No. 2, Mar. 1978, pp. 121–138.
"The Most Accurate & Cost Effective Method of Inventory Control Ever," Video Masters Incorporated, Kansas City, Mo.
"Video Car Identification System," Video Masters Inc., Kansas City, Mo.

Primary Examiner—James J. Groody
Assistant Examiner—Michael D. Parker
Attorney, Agent, or Firm—Robert R. Jackson

[57] ABSTRACT

To speed the transmission of video images via transmission lines which can be of relatively low grade (e.g., voice-grade telephone transmission lines), each video image is encoded as a plurality of pixels, and the bits for each pixel are transmitted in order of significance (i.e., the most significant bits for all pixels are sent first, then the next most significant bits for all pixels are sent, and so on). At the receiver the image is displayed as it is received, and transmission is terminated as soon as the observer of the display has sufficient information about the image. Although many other applications are possible, the illustrative embodiment is a remote railroad freight car identification system.

16 Claims, 3 Drawing Sheets

REMOTE VIDEO OBSERVATION SYSTEMS

BACKGROUND OF THE INVENTION

This invention relates to remote video observation systems, and more particularly to systems for facilitating the observation of scenes or objects at substantial distances from the observer even though only relatively low-cost transmission media may be available between the original scenes or objects and the observer.

Although this invention has many other possible uses, the invention will be fully understood from an explanation of its use in identifying moving railroad freight cars at locations remote from the observer required to make the identification.

Raymond et al U.S. Pat. No. 4,264,927 (which is hereby incorporated by reference herein) shows a freight car identification system in which a remote track-side television-type camera is connected via a video signal transmission line to a centrally located videotape recorder. The system is automatically activated when a train approaches the camera and, while activated, videotapes a continuous side view of the train as it passes. As soon as the train has passed, the system shuts itself off until the next train approaches. At any convenient time, the operator of the system ("the observer") removes the recorded videotape from the recorder and plays it back on a playback machine in order to identify the freight cars in the train from the letters and numbers painted on the sides of the cars.

The system shown in the '927 patent works well and has achieved wide market acceptance. In some situations, however, it is desired to locate the camera at a considerable distance from the observer. In those instances it is usually quite costly—sometimes prohibitively costly—to provide the high-grade video communications link required between the camera and the videotape recorder. For example, railroads would frequently like to locate the camera many miles—sometimes 100 or more miles—from the observer. This may reduce the number of observation points a railroad needs by allowing greater centralization of the observation function. It may also reduce the number of employees required as observers. Heretofore, however, the high cost of long, video-grade communications links has been a major disadvantage of such otherwise desirable system configurations.

In view of the foregoing, it is an object of this invention to provide remote video observation systems which do not require high-grade communications links between the remote camera and the central observer.

It is another object of the invention to provide improved remote freight car identification systems.

SUMMARY OF THE INVENTION

These and other objects of the invention are accomplished in accordance with the principles of the invention by providing remote video observation systems in which selected images from the video signal produced by a remote video camera are digitized and stored on a digital data storage medium such as a disc memory. This memory is part of the apparatus located near the camera. When the observer (who may be many miles from the camera) wishes to observe the stored video data, the data for an image to be viewed is retrieved from the memory and transmitted to the observer's location via transmission media which can be of relatively low cost (e.g., a voice-grade telephone line). (Of course, if higher-grade transmission lines are available, they can also be used.) The most significant bit of each pixel-representing byte is sent first, and the resulting high-contrast image component is displayed for observation by the observer. In many instances, this one high-contrast image component is sufficient to enable the observer to see the required information in the original scene (e.g., the letters and numbers painted on the side of a freight car). If that is the case, no further image components need be transmitted for that scene and the system can begin to transmit the most significant bit data for the next scene. This greatly reduces the time and/or bandwidth required to transmit the video information, and contributes to the ability of the system to satisfactorily employ relatively low-grade transmission media. In addition, time and/or bandwidth requirements may be further reduced by using data compression techniques on the image component data prior to transmission. Such compression is typically highly effective on high-contrast image data such as the above-mentioned most significant bits because that data tends to be highly compressible. Time and/or bandwidth requirements can be still further reduced by transmitting only a portion of the image (e.g., in the case of the freight car identification embodiment, the horizontal band most likely to contain the car-identifying numbers).

If the most significant bit data is not sufficient to enable the observer to see the required information in the original scene, the system transmits the next most significant bit from each pixel-representing byte. Once again, data compression and/or the field-of-view limitations mentioned at the end of the preceding paragraph can be employed to reduce the amount of data that must be transmitted. At the receiver, the next most significant bit data is added to the previously transmitted most significant bit data to increase the number of image gradations (e.g., "gray levels" in monochromatic systems) displayed to the observer. Once again, this may be sufficient to enable the observer to see the required information in the original scene, and further transmission of data for that scene can be avoided. If not, however, the process of sending successive, increasingly less significant bits from each pixel-representing byte can be continued until the observer has sufficient information about the original scene or until all data regarding that scene has been transmitted.

Further features of the invention, its nature and various advantages, will be more apparent from the accompanying drawings and the following detailed description of the invention.

DETAILED DESCRIPTION OF THE INVENTION

As has been mentioned, the principles of this invention can be used in many video signal transmission applications. The invention will be fully understood, however, from an explanation of its application to a remote freight car identification system.

Figure 1:
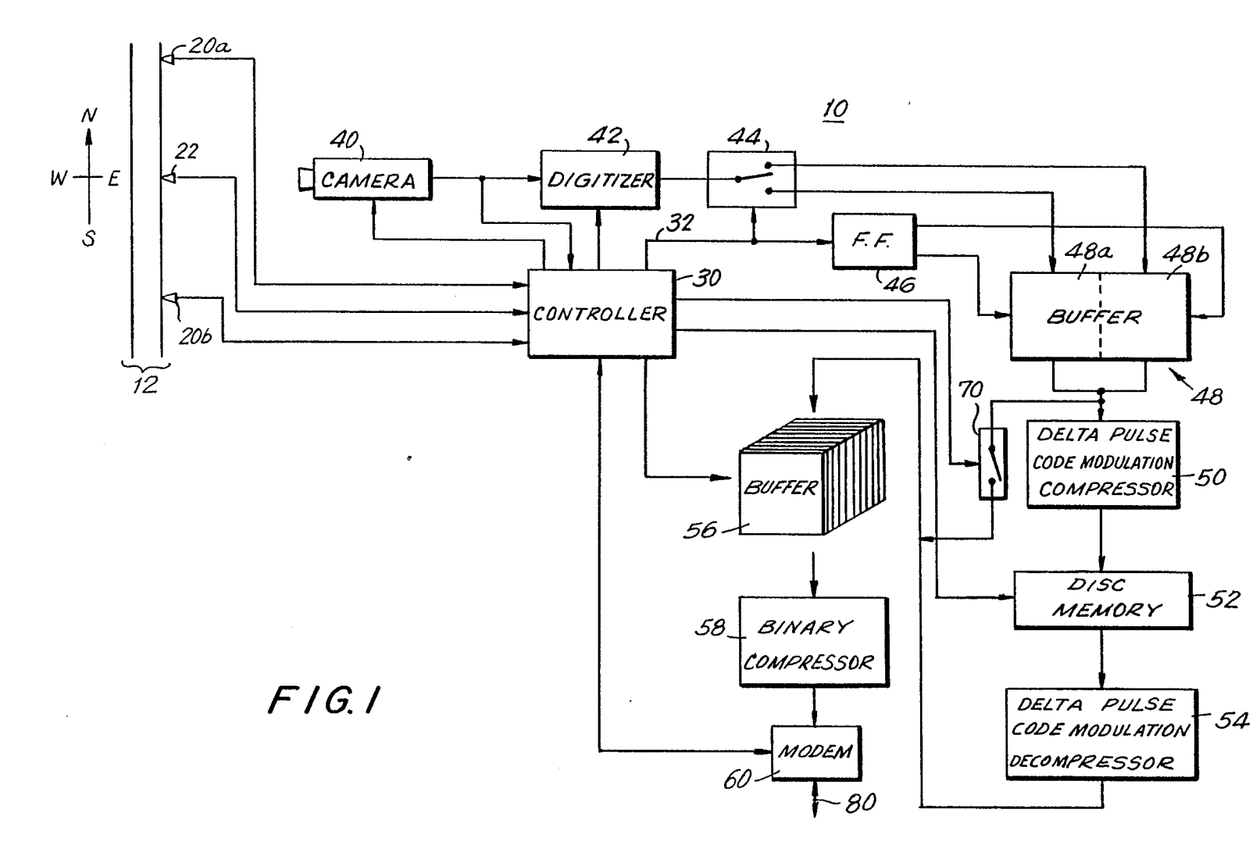
FIG. 1 is a schematic block diagram of the apparatus associated with a remote video camera in an illustrative embodiment of the invention.

FIG. 1 shows the portion 10 of the freight car identification system apparatus which is located at or near the point along railroad track 12 at which the freight cars in passing trains are to be identified from the ordinary letters and numbers painted on their sides.

Sensor assembly 20a alerts the system to the approach of a train moving south along track 12 (compass directions are entirely arbitrary), while sensor assembly 20b alerts the system to the approach of a train moving north. In response to a signal from either of sensor assemblies 20, controller 30 starts camera 40 and the other components responsive to the video output of camera 40. Sensor assembly 22 produces an output signal pulse each time a railroad wheel passes that location. From the output signals of sensor assemblies 20 and 22 (and, if necessary, other similar sensor assemblies) controller 30 determines such parameters as train presence, train speed, train direction, and wheel count. Suitable sensor arrangements and controller apparatus for performing these functions is shown, for example, in the above-mentioned '927 patent. If desired, most or all of the functions of controller 30 may be performed by a suitably programmed, conventional, digital micro- or minicomputer.

Camera 40 may be a conventional, high-speed, black and white, video camera. Suitable cameras and camera arrangements are desc.ibed, for example, in the '927 patent. Another possible type of camera is a conventional charge coupled device ("CCD") camera with a variable integration shutter.

Camera 40 is aimed at the side of track 12 and is focused on the side of a train passing on that track. If auxiliary lighting is required, it can be provided and operated as described in the '927 patent. Although other parameters may be employed, camera 40 may be illustratively positioned so that approximately 15 horizontal feet of the side of a train on track 12 is within the field of view of the camera.

As will be more apparent as the description proceeds, the apparatus of this invention operates by transmitting to the observer (FIG. 2) a succession of "still" images of the side of the train. In order for these stills to collectively capture the entire side of the train, one still must be taken at least each time a length of train equal to the horizontal field of view of camera 40 has passed the camera. In order to do this, controller 30 used the train speed information (determined as described above) to produce an output signal pulse on lead 32 at least each time a length of train equal to the horizontal field of view has passed camera 40. (If train speed is not known with sufficient precision, it may be desirable to provide a slight overlap between adjacent images.) The signal on lead 32 is used to control switch 44 and flip-flop 46 as described in detail below.

Once activated as described above, camera 40 operates continuously to produce a conventional analog video output signal (e.g., a standard RS 170 signal) of the scene before it. If desired, controller 30 may stop camera 40 if the controller (using sensor assemblies 20 and 22) detects that the train has stopped and/or reversed direction. In that event, controller 30 may restart the camera when the train resumes its original direction of travel and (if reverse motion occurred) after the portion of the train previously viewed by camera 40 has again passed the camera. The latter of these functions can be based in part on the above-mentioned wheel count data. Of course, controller 30 also stops camera 40 when the entire train has passed the camera. Once again, suitable sensor and controller apparatus for performing these functions is shown, for example, in the '927 patent.

Assuming that the output signal of camera 30 is a standard RS 170 signal, each "frame" (occupying 1/30th of a second) comprises 525 horizontal scan lines, not all of which include video information because some are used for video control signals (e.g., the so-called vertical interval). The lines are scanned alternately from top to bottom, so that each frame also comprises two "fields," each occupying 1/60th of a second. The first field includes horizontal scan lines 1, 3, 5, 7, 9, etc., while the second field includes horizontal scan lines 2, 4, 6, 8, 10, etc. It has been found sufficient for freight car identification to use only one of the two fields associated with any frame. In addition, this automatically eliminates any blurring that might result from using both fields when imaging fast-moving trains. Accordingly, each half of buffer 48 (described in more detail below) is only large enough to hold the data associated with the visible portion of one field (i.e., 240 horizontal scan lines, each of which includes 256 picture elements or pixels). It will be apparent to those skilled in the art, however, how the principles of this invention can be extended to systems requiring utilization of both fields of a frame.

The analog output signal of camera 40 is applied to digitizer 42, which preferably employs conventional flash analog-to-digital conversion to sample each horizontal scan line 256 times and produce an 8-bit (1-byte) digital equivalent value of each sample. Accordingly, a digital gray scale having 256 gradations or gray levels is employed.

The digital output signal of digitizer 42 is applied to switch 44, which changes state each time controller 30 produces an output signal on lead 32 as described above (i.e., each time a length of train equal to the horizontal field of view of camera 40 has passed the camera). Accordingly, switch 44 typically remains in one position for several frames. This means that the digital data associated with all of those frames is directed to one of the two halves of buffer 48. As mentioned above, each half of buffer 48 can store the data for one field. Accordingly, the data in the half of a buffer 48 to which data is currently being directed is repeatedly updated as long as new data is being directed to that half of the buffer.

When controller 30 produces an output signal on lead 32 (thereby indicating that a length of train equal to the field of view of camera 40 has passed the camera, and that it is accordingly time to capture another still image of the side of the train), switch 44 changes state to direct subsequent data into the other half of buffer 48. This "freezes" or prevents further updating of the data in the first half of the buffer. At the same time, flip-flop 46 changes state to cause the half of buffer 48 which is now frozen to begin to dump its contents to delta pulse code modulation compresser 50. Advantageously, controller 30 can only produce a pulse on lead 32 in synchronization with the vertical interval in the output signal of camera 40 so that the operation of elements 44, 46, and 48 is thereby synchronized with the video signal.

Because each field contains 240 horizontal scan lines of 256 pixels or bytes, each field requires 61,440 bytes. Many freight trains include 100 or more cars and are therefore a mile or more long. Because a still picture must be taken every 15 feet in order to record the entire side of the train, it may be necessary to take 350 or more stills of a full-length train. Thus it would not be at all uncommon to require 21 M bytes or more to store all the stills for a typical train. This is not an excessive amount of storage by present-day standards in view of the fact that ordinary personal computers are available with disc memories capable of storing 60 M bytes or more. However, to conserve disc space and to speed the transfer of image data to and from the disc, any of a number of conventional data compression techniques can be applied to the output signal of buffer 48. The preferred data compression technique is so-called delta pulse code modulation compression which is performed by delta pulse code modulation compressor 50. Compressor 50 converts successive buffer 48 output bytes to half-bytes or nibbles based on the amount of change between successive bytes. This reduces the data for each field from 61,440 bytes to 30,720 bytes, thereby conserving disc space and speeding transfer of the data to disc memory 52.

The compressed data output of compressor 50 is stored in preferably conventional disc memory 52 under the control of controller 30, which maintains a list of the storage locations of successive images. Elements 54, 56, and 58, which are associated with retrieving image data from disc memory 52, are typically inoperative while data is being stored on the disc.

After all the image data for a train has been stored in disc memory 52, controller 30 typically turns off camera 40 and the associated image-gathering apparatus. The apparatus of FIG. 1 can then either wait for the operator of the system to interrogate it as to whether or not there is any new image data, or controller 30 can send a message via modem 60 and transmission line 80 to the apparatus of FIG. 2 to alert the operator to the fact that new train data has been gathered and is ready for transmission to the operator.

Figure 2:
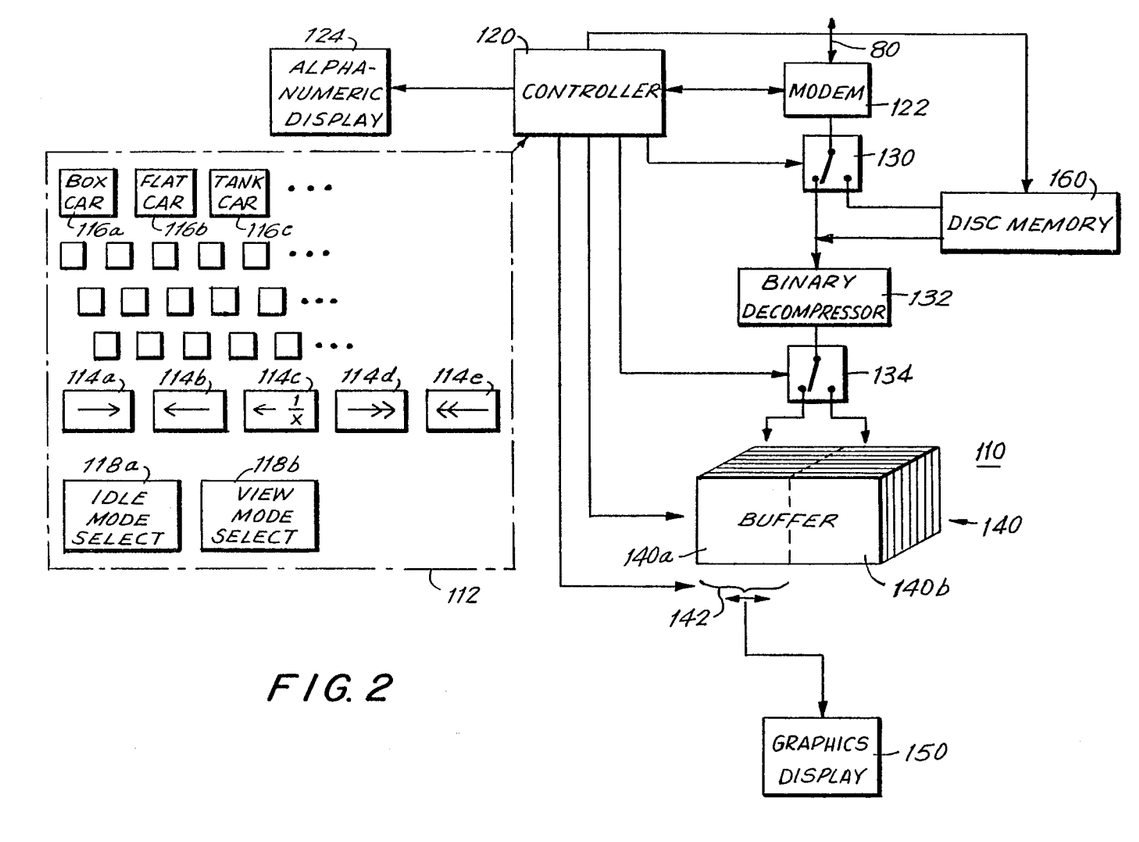
FIG. 2 is a schematic block diagram of the apparatus associated with the observer's location in the embodiment of FIG. 1.

When the operator, who is at the location of the apparatus 110 shown in FIG. 2 (typically a considerable distance (e.g., many miles) from the apparatus of FIG. 1) is ready to view the image data gathered as described above, the operator operates the keys on keyboard 112 required to cause controller 120 to send an appropriate message to controller 30 via modem 122, transmission line 80, and modem 60. Any of several different types of messages can be exchanged in this way by controllers 30 and 120, and corresponding messages are displayed on alphanumeric display 124 for the benefit of the operator. For example, the operator may request that controller 30 report the status of apparatus 10 (e.g., whether the camera is on or off, whether any new train data has been gathered since the last interrogation, how much disc memory is still available, whether or not any faults have been detected in apparatus 10, etc.). Similarly, the operator may request that controller 30 report non-video data gathered by apparatus 10 (e.g., the date and time of passage of each train for which data has been gathered, the direction of travel of each such train, the wheel count of each such train, etc.). In response to these and other similar inquiries, controller 30 sends back appropriate answers via modem 60, transmission line 80, and modem 122, and controller 120 decodes those answers and causes appropriate messages to be displayed on preferably conventional alphanumeric display 124. If desired, most or all of the functions of controller 120 can be performed by a suitably programmed, conventional, digital micro- or minicomputer.

Assuming that apparatus 10 has captured and stored in disc memory 52 video information which the operator wishes to see, the operator sends additional messages to cause controller 30 to initiate transmission of that video information. For example, if a new train ("Txx," where T is the train message code letter and xx is the number of the train (a relative number assigned by controller 30)) has been recorded by apparatus 10 and the operator wishes to view the stills of that train, the operator uses keyboard 112 to cause controller 120 to send a message to controller 30 instructing controller 30 to locate the video image data for train Txx in disc memory 52 and to begin to transmit that data to the operator as will now be described in detail.

Controller 30 locates the data for the first still of train Txx in disc memory 52 and causes that data to be read out and applied to delta pulse code modulation decompressor 54. Decompressor 54 is merely the reverse of compressor 50. Accordingly, decompressor 54 restores the image data to substantially the form that it had in buffer 48 (i.e., one byte per pixel). The resulting data is stored in buffer 56, which may be a conventional computer-type memory.

Buffer 56 may be thought of as a three-dimensional data storage device made up of eight parallel planes (referred to for convenience herein as "bit-planes"). Each bit-plane stores one bit from each byte of the image data output by decompressor 54. For example, the most significant bit of each byte may be thought of as being stored in the forwardmost bit-plane ("the most significant bit-plane"), the next most significant bit of each byte may be thought of as being stored in the next-to-forwardmost bit-plane ("the second most significant bit-plane"), and so on, with the least significant bit of each byte being thought of as stored in the rearwardmost bit-plane ("the least significant bit-plane").

When buffer 56 is fully loaded with the data for a still (i.e., one field of 240 horizontal scan lines of 256 pixels each), controller 30 causes only the data from the most significant bit-plane to be read out. Note that this is exactly one-eighth of the total data stored in buffer 56, or the equivalent of only 7,680 bytes rather than the full 61,440 bytes stored in buffer 56. This most significant bit-plane data is applied to binary compressor 58 which employs any of several conventional data compression techniques to reduce the number of bits (or bytes) required to represent the applied data. For example, a conventional run-length compression technique can be used in which each successive numerical value represents a corresponding number of consecutive ones or zeros in the original data stream (e.g., if the original data stream included 22 ones followed by 55 zeros, the corresponding run-length representation would be 22, 55). Because the data in the most significant bit-plane tends to be very high-contrast image data (i.e., many long strings of consecutive ones or zeros), this data is highly compressible using this technique. (To help maintain the effectiveness of run-length compression when the consecutive strings become shorter and/or when there are many short strings, a modified Hoffman coding can be applied to the compression data. This technique employs a small number of bits to code low counts and more bits to code larger counts (e.g., two bits for counts of one or two, and 12 bits for counts of 64.)) These techniques make possible compression factors of 20 to 1 or better, especially with image data for large objects such as railroad freight cars. Accordingly, binary compressor 58 might be able to compress the 7,680 bytes associated with the most significant bit plane to a mere 384 bytes (assuming a compression factor of 20 to 1). Assuming, for example, that transmission line 80 is a voice-grade, telephone-type transmission line, and that modems 60 and 122 are conventional packetized ensemble modems (e.g., Trailblazer model modems available from Telebit Corporation of Marietta, Ga., and rated for up to 18,000 bits per second) providing full duplex operation and having an effective throughput of approximately 14,000 bits per second, 384 bytes can be transmitted via line 80 in about 0.22 seconds.

At the receiver (FIG. 2), controller 120 causes switch 130 to direct the incoming video data to binary decompressor 132, which operates on the data to reverse the effect of compressor 58. Accordingly, decompressor 132 restores the data to its original bit-plane form. Switch 134, under the control of controller 120, directs the restored bit-plane data to one of the two halves of buffer 140, which (like buffer 56) may be a conventional computer-type memory.

Each half of buffer 140 can be thought of as similar to buffer 56. Assuming that data for the first image of train Txx is to be stored in buffer half 140a, controller 120 causes the most significant bit-plane data to be stored in the most significant bit-plane portion of buffer half 140a. At the same time, controller 120 controls the application of buffer 140 data to preferably conventional graphics display 150 so that only the data in buffer portion 140a is applied to the graphics display. Accordingly, the very high-contrast image which results from having only the most significant bit-plane data applied to display 150 will appear on that display. It has been found that with only this much video information, at least approximately 50% of railroad freight cars can be identified from the letters and numbers painted on their sides. If the operator can identify the freight car from this image, the operator depresses appropriate keys on keyboard 112. For example, if the operator already has the intended consist list for train Txx and the car image he or she sees agrees with that list, he or she may merely press an "acknowledge" key on keyboard 112. On the other hand, if the operator does not have a consist list and is being required to gather the data for such a list, he or she types in the car-identifying letters and numbers seen on display 150. It is also possible that the operator may be able to tell from the most significant bit-plane image on display 150 that this particular still contains no car-identifying letters or numbers at all. In that case, the operator will typically depress one of keys 114 (i.e., "forward one frame" key 114a, "back one frame" key 114b, "back a fractional frame" key 114c, "fast forward" key 114d, or "fast reverse" key 114e). Any of the foregoing keyboard operations indicates that the operator is satisfied with the level of detail visible in the current image. Controller 120 therefore sends an appropriate message to controller 30 to stop the transmission of data from buffer 56. In addition, if the key or keys operated by the operator call for transmission of another image, the message from controller 120 to controller 30 causes controller 30 to erase buffer 56 and begin the process of transmitting the next image as described in detail below. On the other hand, if the operator needs or wants more data for the current image, the operator merely waits and that additional data is immediately and automatically transmitted.

Assuming that more data for the current image is to be transmitted, as soon as the most significant bit-plane data in buffer 56 has been transmitted, controller 30 accesses the next or second most significant bit-plane data in that buffer. The data from this bit-plane is processed by elements 58, 60, 80, 122, 130, 132, and 134 as described above and loaded into the second most significant bit-plane in buffer portion 140a. This increases the number of gray levels available for display on display 150 from two (when only the most significant bit-plane data was present in buffer 140) to four, thereby adding more detail to the image on display 150. Although the data from the second most significant bit-plane may not be as highly compressible (in binary compressor 58) as the most significant bit-plane data, it is still typically quite compressible (e.g., by a factor of ten or more). Assuming such a compression factor, even the second most significant bit plane data can be transmitted via transmission line 80 in about half a second.

With the data from two bit-planes driving display 150, it has been found that many of the freight cars which cannot be identified from only one bit-plane can now be identified. If that is the case and the operator is therefore finished with the current frame, he or she operates one or more of the keys on keyboard 112 as described above with similar results. However, if the operator needs still more data from the current frame, he or she does nothing and the system automatically transmits the third most significant bit-plane from buffer 56 to buffer 140a to add yet another level of detail to the image on display 150. The third most significant bit-plane data is somewhat less compressible (in compressor 58) than the previous data, so it may take approximately one second to transmit this portion of the image data. Still more freight cars can be identified with images made up of three bit-planes. However, if three bit-planes are not yet sufficient, the process of sending successive, increasingly less significant bit-planes continues until sufficient information has been transmitted to enable the operator to perform his or her task or until all eight bit-planes have been transmitted. The data for each successive bit-plane is less compressible (in compressor 58) so that transmission of the final bit plane might take 5 or more seconds.

Note that if the principles of this invention were not employed, it would probably take at least about 45 seconds to transmit the data for one field. With this invention, sufficient information about most fields can be transmitted in less than two seconds, and only a very few fields (less than 5 or 10%) will be found to be so indistinct or faint as to require transmission of more than three or four bit-planes.

As mentioned above, as soon as the operator has sufficient information about a particular image, he or she depresses the appropriate key or keys on keyboard 112. This typically causes controller 120 to send a message to controller 30 to erase buffer 56 and (unless transmission is to be halted altogether) to begin transmission of the data for another image. Although other criteria may be used for selection of the next image as described in detail below, in the simplest case the next image transmitted is the next image stored in disc memory 52 (i.e., the image of the portion of the side of the train immediately following the portion for which image transmission was just completed). This would result, for example, if the operator depressed "forward one frame" key 114a on keyboard 112. Assuming that this is the next image to be transmitted, controller 30 retrieves the data for that image from disc memory 52 and begins transmitting it to apparatus 110 exactly as described above for the first image (i.e., one bit-plane at a time, from most significant to least significant). As soon as this transmission begins, controller 120 throws switch 134 so that buffer portion 140b (rather than buffer portion 140a) receives that data. (Controller 120 changes the position of switch 134 each time transmission of a new image begins.) The last image transmitted remains in buffer portion 140a. Controller 120 also controls the application of buffer 140 data to graphics display 150 (i.e., by moving bracket 142 to the right) so that only the data in buffer portion 140b is applied to the display. Thus the same sequence of operations is repeated for this second image as was described above for the first image (i.e., successive bit-planes are transmitted one after another until the operator is satisfied and stops the transmission, or until all of the bit-planes for the image have been transmitted).

Figure 3:
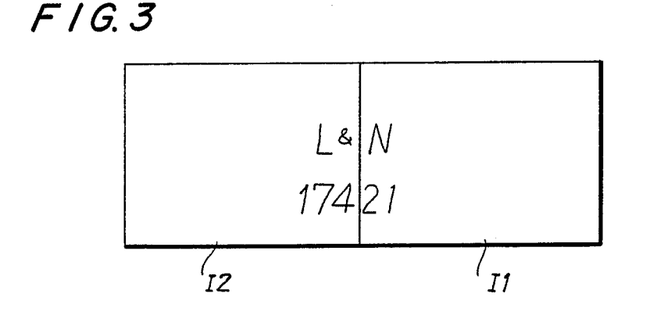
FIG. 3 shows two successive pictures taken by the apparatus of FIG. 1.

It is possible that the identification of a freight car may be split between two adjacent images as suggested in FIG. 3, in which I1 identifies one image of the side of a freight car bearing the identification L&N 17421, and I2 identifies another adjacent image of the side of that car. If the train were travelling from left to right in FIG. 3, picture I1 would be taken and stored first, and then I2 would be taken and stored. If the train were travelling in the opposite direction, picture I2 would be taken and stored before picture I1.

Figure 4:
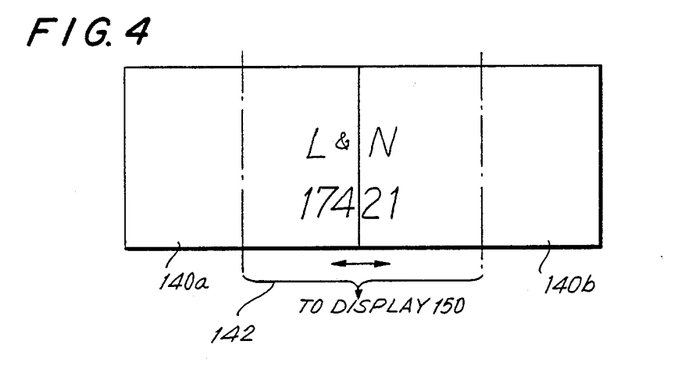
FIGS. 4 and 5 show two possible ways in which the data for the pictures of FIG. 3 may be reconstructed by the apparatus of FIG. 2.
Figure 5:
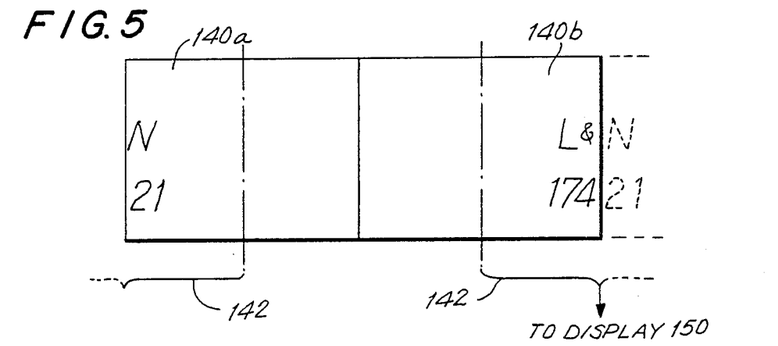

In most such instances of split identifications, a skilled operator can completely and accurately identify the car despite the fact that the identifying information is split and regardless of the order in which the images are presented to the operator. Occasionally, however, the operator may need or want to see the complete car identification in one image. This is accomplished in accordance with the principles of this invention by storing the data for adjacent images in buffer portions 140a and 140b, and using processor 120 to cause appropriate portions of the image data in each buffer portion to be applied to display 150. For example, if images I1 and I2 are respectively stored in buffer portions 140a and 140b as shown in FIG. 4, an unsplit image of the car identification can be produced by displaying on display 150 the portions of the buffer data indicated by bracket 142. Normally the data for display 150 comes entirely from one or the other of buffer portions 140a or 140b. However, when a split image is to be eliminated (after both portions of that image are stored in buffer 140), the operator can use "back a fractional frame" key 114c to effectively cause bracket 142 to step left or right across buffer 140 to gradually delete from display 150 the unwanted portion of the most recently transmitted image and to add to display 150 the contiguous portion of the image transmitted just prior to the most recently transmitted image. Bracket 142 "wraps-around" the extreme opposite ends of buffer 140 as shown in FIG. 5 so that no matter how the images happen to be stored in the buffer, an unsplit image can always be produced on display 150. Each operation of key 114c can cause the displayed image to shift laterally any predetermined fractional amount (e.g., one-tenth of a frame, one-eighth of a frame, one-quarter of a frame, etc.). Note that unlike operation of keys 114a, b, d, and e, operation of key 114c never initiates transmission of additional video information from apparatus 10. All of the required data is already stored in buffer 140. Operation of key 114c does, however, stop transmission of video data from apparatus 10, if such transmission has not already been stopped.

At this point it is appropriate to consider operation of the remaining keys 114. As mentioned above, operation of key 114a usually causes apparatus 10 to begin to transmit data for the image taken immediately after the most recently transmitted image. However, if that data is already stored in buffer 140 because the last key to be operated was "back one frame" key 114b, then the system can be arranged to simply apply that buffer 140 data to display 150. If additional detail regarding that image is now required, transmission of that data from apparatus 10 can be resumed from the point at which it was last interrupted in order to avoid retransmission of the same data.

Operation of "back one frame" key 114b causes display of the image taken just before the image currently being displayed. If the most recently operated key was "forward one frame" key 114a, then the required data will still be present in buffer 140 and can be immediately displayed on display 150 without retransmission from apparatus 10. If more detail regarding that image is required, apparatus 10 can transmit data for that image from the point at which that transmission was last interrupted. On the other hand, if the most recently operated key was key 114d or 114e, then the required image data will either never have been transmitted from apparatus 10 or, if previously transmitted, will have been erased from buffer 140. In either case, the required data is retrieved from disc memory 52 and transmitted to apparatus 110 for display on display 150 exactly as described above.

Operation of "fast forward" key 114d causes controller 120 to send a message to controller 30 to skip over several images (e.g., two) and transmit the image after the skipped images (e.g., the third image from the most recently transmitted one). This allows the operator to skip over images he or she knows contain no car-identifying information or which are otherwise not of interest. "Fast reverse" key 114e operates similarly, but in reverse.

Transmission of video data via transmission line 80 can be speeded up even further in accordance with the principles of this invention by use of keyboard keys 116a, b, c, etc. Although there are exceptions to any such rules, most railroad cars of any one type tend to have their identifying information in about the same place. For example, box car identifications tend to be on the left near the middle of the vertical dimension of the car. Flat car identifications tend to be near the center of the car and quite low because of the nature of the car. Even in mixed freight trains, similar cars tend to be grouped together, and there are many trains in which one type of car predominates.

Keys 116 allow the operator to tell the system what type of car the operator is seeing. For example, if the operator is seeing box cars, the operator can press key 116a; if flat cars, key 116b; etc. In response, controller 120 sends a message to controller 30 which causes apparatus 10 to transmit only the portion of the video image data likely to contain car-identifying information for the specified type of car (e.g., for flat cars a low, vertically narrow "window" or portion of the image; for box cars, a somewhat higher, vertically wider window or portion of the image; etc.). Thus for flat cars there is probably no need to transmit approximately three-quarters of the vertical height of the image. Accordingly, controller 30 causes only the buffer 56 data for the portion of the image that is of interest for flat cars to be transmitted, thereby reducing transmission time for such images by approximately three-quarters. Similarly, for box cars there is probably no need to transmit the extreme upper and lower portions of the image, which may collectively comprise approximately one-half the image. Controller 30 therefore causes only the buffer 56 data for the middle portion of the image to be transmitted, thereby reducing box car image transmission time by approximately one-half.

The type-of-car information which results from operation of keys 116 is also usable in another way in accordance with this invention. When the operator is able to see the identification of a known type of car, it may be possible to avoid transmission of the next one or more images on the basis that the identification of the next car most probably cannot occur in those images. For example, if flat cars are typically 80 feet long with identifications near the center, when a flat car identification is seen in one 15-foot image, at least the next three 15-foot images will almost certainly contain no car-identifying information and can be skipped (i.e., not transmitted from apparatus 10 to apparatus 110). Indeed, if one assumes that cars of any given type are likely to occur in groups, then four images can be skipped after each flat car is identified.

The system can be constructed to perform this type of image skipping automatically. The most recently operated key 116 tells controllers 120 and 30 what type of car is currently being observed. Then as soon as the operator depresses the other keyboard key or keys that tell the system the operator has adequately seen a car identification, the system uses the above-mentioned car-type information to determine how many images to skip. Having made this determination, controller 30 retrieves from disc memory 52 the data for the image immediately after the skipped image or images, and transmission of that data begins as described above. This automatic skipping of uninformative images greatly increases the efficiency of the system. Of course, any image that is skipped can be subsequently viewed, if desired (e.g., by operation of "back one frame" key 114b).

The foregoing describes what may be characterized as the principal mode of operation of the system. The system may also have other operating modes as will now be described.

Whenever there is going to be a period of time when there will be no operator activity at apparatus 110 (e.g., at night, during a meal break, or at any other time when the operator is otherwise engaged), the system can be placed in "idle mode" by operating keyboard key 118a. While in idle mode, the system automatically transfers from disc memory 52 to similar disc memory 160 any image data (or a predetermined portion of any image data) that has not been previously transmitted to apparatus 110. During such idle mode transmissions, controller 120 throws switch 130 so that the incoming data is applied to and stored in disc memory 160. In order to save transmission time, it may be sufficient to transmit only the three or four most significant bit-planes of each image, since it has been found that more than about 90 or 95% of all freight cars can be identified from just that much image data. (If additional data is required for any image, the operator can subsequently retrieve that data from disc memory 52.)

When the operator is again ready to view image data, any data that was transmitted to apparatus 110 during idle mode is retrieved from disc memory 160 without any of the delays associated with transmission of data via transmission line 80. In all other respects, however, the system operates as though the data were being sent from apparatus 10.

Another possible operating mode is so-called "view mode" which is selected by operating keyboard key 118b. View mode enables the operator to see at least some of the pictures currently being taken by camera 40. When view mode is selected, controller 120 sends an appropriate message to controller 30. The next time controller 30 causes buffer 48 to dump data to compressor 50, it also momentarily closes switch 70 so that the data from buffer 48 is also transferred to buffer 56. Thereafter, elements 30, 56, 58, and 60 cause that image data to be transmitted via transmission line 80 exactly as described above. Apparatus 110 causes this data to be displayed on display 150, also exactly as described above. As soon as the operator is satisfied with that image, he or she presses a key or keys on keyboard 112. Controller 120 sends an appropriate message to controller 30, and controller 30 responds by repeating the process of momentarily closing switch 70 the next time buffer 48 is to be dumped. In this way the operator can see selected images produced by camera 40 at very nearly the time those images were produced.

While the invention has been described in the context of an illustrative embodiment intended for use in facilitating the remote identification of railroad freight cars, it will be apparent to those skilled in the art that the invention has many other possible applications. For example, the invention can be used in many types of remote inspection, surveillance, and/or recognition applications such as in the security or protection field (e.g., bank, store, or office surveillance), traffic monitoring or control, and manufacturing process product inspection. The invention also has application in such areas as video teleconferencing, video-augmented telephone communications, etc. Still other applications within the scope of this invention will occur to those skilled in the art. Even within the context of freight car identification systems, it will be apparent to those skilled in the art that the above-described embodiment is merely illustrative, and that various modifications can be made without departing from the scope and spirit of the invention. For example, although certain data compression techniques have been mentioned above, many other such techniques are known and can be employed if desired.

We claim:

1. The method of transmitting video images from a sender to a receiver comprising the steps of:
    encoding at the sender each image as a plurality of digitally coded pixels;
    transmitting from the sender to the receiver a first portion of the data for each pixel, said first portion having the same significance for all pixels;
    displaying at the receiver the portion of the image represented by said first portions; and
    transmitting from the sender to the receiver a second portion of the data for each pixel only if said portion of the image represented by said first portions is not sufficient information about the original image, said second portions having the same significance for all pixels.

2. The method defined in claim 1 further comprising the step of:

displaying at the receiver the portion of the image represented by said first and second portions if said second portions have been transmitted.

3. The method defined in claim 1 wherein each said first portion is the most significant digit of the data for the associated pixel.

4. The method defined in claim 3 wherein each said second portion is the second most significant digit of the data for the associated pixel.

5. Apparatus for transmitting video images from a sender via a transmission medium to a receiver comprising:
   first means associated with the sender for encoding each image as a plurality of digitally coded pixels;
   second means associated with the sender for applying to the transmission medium for transmission to the receiver a first portion of the data for each pixel, said first portions having the same mathematical significance for all pixels;
   third means associated with the receiver for receiving said first portions from the transmission medium and for displaying the portion of the image represented by said first portions;
   fourth means associated with the receiver for applying to the transmission medium for transmission to the sender a signal indicative of the acceptability of the image displayed by said third means; and
   fifth means associated with the sender for receiving said signal indicative of the acceptability of the image displayed by said third means and for applying to the transmission medium for transmission to the receiver a second portion of the data for each pixel only if said signal indicates that the image displayed by said third means is not acceptable, said second portions having the same mathematical significance for all pixels.

6. The apparatus defined in claim 5 further comprising:
   sixth means associated with the receiver for receiving said second portions from the transmission medium and for displaying the portion of the image represented by said first and second portions if said second portions have been transmitted.

7. The apparatus defined in claim 5 wherein each said first portion is the most significant digit of the data for the associated pixel.

8. The apparatus defined in claim 7 wherein each said second portion is the second most significant digit of the data for the associated pixel.

9. Apparatus for remote observation of objects at a point of observation which is remote from said objects comprising:
   first means adjacent the objects for periodically generating data representative of an image of said objects, said data being broken into segments, each of which represents an element of said image;
   second means adjacent said objects for transmitting to said point of observation the most significant portion of the data segment associated with each image element;
   third means adjacent said point of observation for receiving said most significant portions and for displaying an image based on said most significant portions;
   fourth means adjacent said point of observation for transmitting to the location of said objects a first signal indicative of the acceptability of the image displayed by said third means;
   fifth means adjacent said objects for receiving said first signal and for transmitting to said point of observation the next most significant portion of the data segment associated with each image element only if said first signal indicates that the image displayed by said third means is not acceptable; and
   sixth means adjacent said point of observation for receiving said next most significant portions and for displaying an image based on said most and next most significant portions if said next most significant portions are transmitted.

10. The apparatus defined in claim 9 wherein said second and fifth means include data compression means for compressing the data prior to transmitting it, and wherein said third and sixth means include means for decompressing the received data in order to restore it to its form prior to compression.

11. The apparatus defined in claim 9 further comprising:
    first data storage means adjacent said objects for storing the data generated by said first means; and
    first data retrieval means adjacent said objects for retrieving from said first data storage means the data for any desired image, and for applying the retrieved data to said second and fifth means.

12. The apparatus defined in claim 11 wherein said first data storage means is a disc memory.

13. The apparatus defined in claim 11 further comprising:
    means adjacent said point of observation for allowing the observer to specify an image stored in said first data storage means and for transmitting to the location of said objects a signal identifying said specified image; and
    means adjacent said objects for causing said first data retrieval means to retrieve from said data storage means the data for said specified image, and to apply the retrieved data to said second and fifth means.

14. The apparatus defined in claim 11 further comprising:
    idle mode selection means adjacent said point of observation for allowing the observer to select an idle mode in which the function of said fourth means is overridden and said second and fifth means perform their functions for successive images;
    second data storage means adjacent said point of observation for storing the data transmitted by said second and fifth means; and
    second data retrieval means adjacent said point of observation for retrieving from said second data storage means the data for any desired image, and for displaying an image based on said retrieved data.

15. The apparatus defined in claim 9 further comprising:
    seventh means adjacent said objects for receiving said first signal and for causing said second means to perform its function with respect to another image of said objects if said first signal indicates that the image displayed by said third means is acceptable.

16. The apparatus defined in claim 15 wherein said objects are the sides of freight cars in a moving freight train, wherein said apparatus further comprises means for determining the speed of said freight train, and wherein said first means is responsive to said means for determining so that the images for which said first means generates data are substantially mutually exclusive and collectively exhaustive of the length of the train.

* * * * *